(12) United States Patent
Koch

(10) Patent No.: US 12,109,493 B2
(45) Date of Patent: *Oct. 8, 2024

(54) SYSTEMS AND METHODS FOR DYNAMIC INVENTORY CONTROL FOR PLAYER-TO-PLAYER EXCHANGES IN AN ONLINE GAMING PLATFORM

(71) Applicant: Mythical, Inc., Sherman Oaks, CA (US)

(72) Inventor: Rudy Koch, Sannanish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/389,180

(22) Filed: Jul. 29, 2021

(65) Prior Publication Data

US 2022/0032193 A1 Feb. 3, 2022

Related U.S. Application Data

(63) Continuation of application No. 16/945,439, filed on Jul. 31, 2020, now Pat. No. 11,135,516.

(51) Int. Cl.
  *A63F 13/58* (2014.01)
  *A63F 13/79* (2014.01)

(52) U.S. Cl.
  CPC .............. *A63F 13/58* (2014.09); *A63F 13/79* (2014.09)

(58) Field of Classification Search
  CPC ..... A63F 13/58; A63F 13/79; A63F 2300/575
  See application file for complete search history.

(56) References Cited

U.S. PATENT DOCUMENTS

| 10,286,325 | B1 | 5/2019 | Ernst |
| 2005/0026675 | A1 | 2/2005 | Hatayama |
| 2008/0207327 | A1 | 8/2008 | Van Luchene |
| 2011/0300923 | A1 | 12/2011 | Van Luchene |
| 2014/0004958 | A1 | 1/2014 | Kishimoto |
| 2019/0262721 | A1 | 8/2019 | MacInnes |

*Primary Examiner* — Yingchuan Zhang
(74) *Attorney, Agent, or Firm* — Esplin & Associates, PC

(57) ABSTRACT

Systems and methods for dynamic inventory control for player-to-player exchanges between users interacting within an online gaming platform are disclosed. Exemplary implementations may: execute an instance of the game; monitor user-specific in-game actions of a user; determine in-game objectives based on the monitored in-game actions; receive information representing virtual items available for exchange; determine metric values representing usefulness of individual virtual items regarding the in-game objectives; and present the individual virtual items such that more useful items are presented more prominently.

14 Claims, 4 Drawing Sheets

User interface 40 inventory 41

| Items: | Item information: | Exchange? | |
|---|---|---|---|
| virtual item 1 | item information 1 | ☐ | action button 42 |
| virtual item 2 | item information 2 | ☐ | |
| virtual item 3 | item information 3 | ☐ | |
| virtual item 4 | item information 4 | ☐ | |
| virtual item 5 | item information 5 | ☐ | |

*Fig. 4A*

User interface 45 inventory 46

| Items: | Seller information: | | Exchange? | |
|---|---|---|---|---|
| virtual item 2 | item info. 2 | ⌄ | ☐ | action button 47 |
| virtual item 1 | item information 1 | | ☐ | indicator 48 |
| virtual item 3 | item information 3 | | ☐ | |
| virtual item 5 | item information 5 | | ☐ | indicator 49 |
| *virtual item 4* | *item information 4* | 👎 | ☐ | |

*Fig. 4B*

SYSTEMS AND METHODS FOR DYNAMIC INVENTORY CONTROL FOR PLAYER-TO-PLAYER EXCHANGES IN AN ONLINE GAMING PLATFORM

FIELD OF THE DISCLOSURE

The present disclosure relates to systems and methods for dynamic inventory control for player-to-player exchanges between users interacting within an online gaming platform.

BACKGROUND

Online gaming platforms are known. Platform operators selling digital in-game assets to the users of online gaming platforms is known. Monitoring certain actions such as winning, losing, and levelling up of users within online gaming platforms is known.

SUMMARY

One aspect of the present disclosure relates to a system configured to provide dynamic inventory control for player-to-player exchanges between users interacting within an online gaming platform. The system may comprise one or more hardware processors configured by machine-readable instructions. The system may execute an instance of a game within the online gaming platform to facilitate presentation of the game to the users. The system may implement in-game actions in the instance of the game in response to action requests for the in-game actions by the users. The presentation of the game may be based on views of the game that are determined during execution of the game. The system may monitor user-specific in-game actions of the first user within the online gaming platform. In some implementations, the system may also monitor user-specific marketplace behavior, social media behavior, and/or other (online) behavior. The system may determine one or more in-game objectives, tasks, missions, and/or goals attributed to the first user. The determination may be based on the user-specific in-game actions. In some implementations, determinations may be based on a combination of different types of monitored action, behavior, and/or other information. The system may receive, from the second user, first information representing a first set of one or more virtual items that the second user has indicated are available for exchange with other users within the online gaming platform. The first set of one or more virtual items are usable within the online gaming platform. The system receive, from the third user, second information representing a second set of one or more virtual items that the third user has indicated are available for exchange with the other users within the online gaming platform. The second set of one or more virtual items are usable within the online gaming platform. The system may determine one or more metric values of a usefulness metric for a first individual item of the first set of one or more virtual items. The usefulness metric for the first individual item may represent usefulness of the first individual item with regard to the one or more in-game objectives, tasks, missions, and/or goals. The system may determine one or more metric values of the usefulness metric for a second individual item of the second set of one or more virtual items. The usefulness metric for the second individual item may represent usefulness of the second individual item with regard to the one or more in-game objectives, tasks, missions, and/or goals. The system may present, to the first user, information regarding individual virtual items selected from the first set and the second set. Visual prominence of the individual virtual items as presented may be determined based on the one or more metric values of the usefulness metrics for the individual virtual items.

Another aspect of the present disclosure relates to a method for dynamic inventory control for player-to-player exchanges between users interacting within an online gaming platform. The method may include executing an instance of a game within the online gaming platform to facilitate presentation of the game to the users. The method may include implementing in-game actions in the instance of the game in response to action requests for the in-game actions by the users. The presentation of the game is based on views of the game that are determined during execution of the game. The method may include monitoring user-specific in-game actions of the first user within the online gaming platform. In some implementations, the method may include monitoring user-specific marketplace behavior, social media behavior, and/or other (online) behavior. The method may include determining one or more in-game objectives, tasks, missions, and/or goals attributed to the first user. The determination may be based on the user-specific in-game actions. In some implementations, determinations may be based on a combination of different types of monitored action, behavior, and/or other information. The method may include receiving, from the second user, first information representing a first set of one or more virtual items that the second user has indicated are available for exchange with other users within the online gaming platform. The first set of one or more virtual items are usable within the online gaming platform. The method may include receiving, from the third user, second information representing a second set of one or more virtual items that the third user has indicated are available for exchange with the other users within the online gaming platform. The second set of one or more virtual items are usable within the online gaming platform. The method may include determining one or more metric values of a usefulness metric for a first individual item of the first set of one or more virtual items. The usefulness metric for the first individual item may represent usefulness of the first individual item with regard to the one or more in-game objectives, tasks, missions, and/or goals. The method may include determining one or more metric values of the usefulness metric for a second individual item of the second set of one or more virtual items. The usefulness metric for the second individual item may represent usefulness of the second individual item with regard to the one or more in-game objectives, tasks, missions, and/or goals. The method may include presenting, to the first user, information regarding individual virtual items selected from the first set and the second set. The visual prominence of the individual virtual items as presented may be determined based on the one or more metric values of the usefulness metrics for the individual virtual items.

As used herein, any association (or relation, or reflection, or indication, or correspondency) involving servers, processors, client computing platforms, exchanges, transactions, in-game actions, in-game objectives, tasks, missions, goals, sellers, buyers, metrics, metric values, reputations, scores, instructions, operations, determinations, presentations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 4A-4B illustrate user interfaces, as may be presented using a system as described, in accordance with one or more implementations.

DETAILED DESCRIPTION

Figure 1:
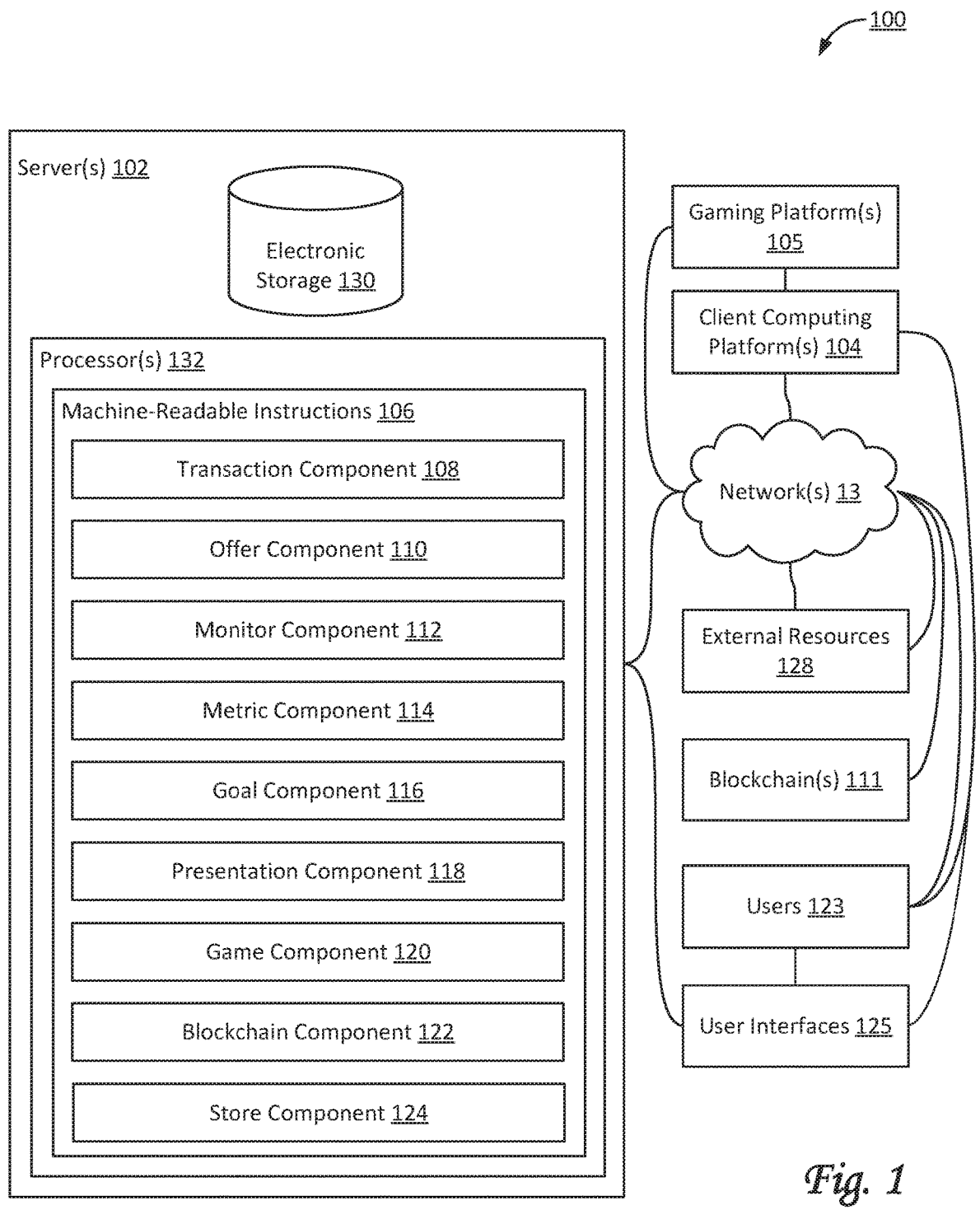
FIG. 1 illustrates a system configured for providing dynamic inventory control for player-to-player exchanges between users interacting within an online gaming platform, in accordance with one or more implementations.

FIG. 1 illustrates a system 100 configured for provide dynamic inventory control for player-to-player exchanges between users 123 interacting within one or more gaming platforms 105 (e.g., an online gaming platform), in accordance with one or more implementations. For example, for individual users, the inventory of available virtual items that are offered by other users for one or more types of exchange, may be dynamically controlled by system 100 when presented to the individual users, such that the presented inventory is user-specific. As used herein, gaming platform 105 may refer to either an individual game, a type of gaming console and its ecosystem, and/or both. Gaming platform 105 may be operated, hosted, and/or owned by a stakeholder of gaming platform 105. For example, a platform operator (and/or another stakeholder) may sell digital in-game assets (e.g., characters, weapons, resources, etc.) to users 123 of gaming platform 105, in commercial transactions. However, this type of transaction involving stakeholders as principal participants is not a player-to-player exchange. As used herein, a player-to-player exchange facilitates individual players to auction, sell, purchase, trade, barter, and/or otherwise exchange (in-game) virtual items that may be used by and/or useful to individual owners thereof, within gaming platform 105. By virtue of the principal participants being individual players, and not stakeholders, player-to-player exchange is not commercial. In other words, individual players may own individual virtual items, and exchange these items with other individual players. As used herein, the term "exchange" (as a noun) may be interpreted as a marketplace.

In some implementations, system 100 may include one or more of electronic storage 130, one or more servers 102, one or more client computing platforms 104, one or more gaming platforms 105, one or more blockchains 111, one or more external resources 128, and/or other components. Users 123 (also referred to as players) may include one or more of a first user, a second user, a third user, a fourth user, and/or other users. A user who sells or offers for sale a virtual item (e.g., to another user) may be referred to as a seller. A user who buys (or who might buy) a virtual item may be referred to as a (potential) buyer.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104.

In some implementations, system 100 and/or server(s) 102 may be configured to communicate with one or more of (online) gaming platform(s) 105, users 123, blockchain(s) 111, and/or other components. Users 123 may include players who play and/or otherwise interact on gaming platform 105. In some implementations, gaming platform 105 may include an online store or marketplace that facilitates exchanges of (in-game) virtual items that may be used within gaming platform 105. In some implementations, gaming platform 105 (and/or another component of system 100) may support an exchange and/or marketplace for users 123 such that different users 123 can otherwise exchange (in-game) virtual items that may be used within gaming platform 105 and/or may be useful within gaming platform 105. In some implementations, users can exchange (in-game) virtual items through (external) online exchange platforms, including but not limited to eBay™. In some implementations, users can perform one or more of these types of exchange of (in-game) virtual items through one or more blockchains 111.

In some implementations, system 100 may include blockchain 111 that may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

A distributed blockchain may act as a (decentralized) database that stores a registry and/or ledger of assets and transactions across one or more networks. In some implementations, a ledger may be implemented as a database. For example, a blockchain is a type of ledger, as well as a type of decentralized database that stores a registry of assets and transactions. A given asset may be owned by a particular user. An asset may include anything of material value or usefulness that is owned by or on behalf of one or more users. In some implementations, a virtual item (that may be used within gaming platform 105 and/or may be useful within gaming platform 105) may be represented by an asset that is recorded on one or more blockchains 111. In some implementations, a right pertaining to an object (e.g., a benefit) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, and/or other rights. For example, in some implementations, rights pertaining to a virtual item (e.g., ownership) may be recorded on blockchain 111.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets (including virtual items). Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Server(s) 102 may be configured by machine-readable instructions 106. Machine-readable instructions 106 may include one or more instruction components. The instruction components may include computer program components. The instruction components may include one or more of a transaction component 108, an offer component 110, a monitor component 112, a metric component 114, a goal component 116, a presentation component 118, a game component 120, a blockchain component 122, a store component 124, and/or other instruction components.

Game component 120 may be configured to execute an instance of a game (e.g., an online game within gaming platform 105) to facilitate presentation of the game to users 123. In some implementations, game component 120 may be configured to implement in-game actions in the instance of the game, e.g., in response to action requests for the in-game actions by users 123. As used herein, the term "game" may refer to one or more games within gaming platform 105. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. In some implementations, user inventories may be managed using blockchain 111. For example, ownership of individual virtual items included in an individual user inventory may be recorded on blockchain 111. In some implementations, individual user inventories may correspond to individual smart contracts stored on blockchain 111.

Monitor component 112 may be configured to monitor actions by individual users 123, including but not limited to in-game actions within gaming platform 105. In some implementations, monitoring by monitor component 112 may be user-specific. In some implementations, monitored actions by users 123 may include selections by users 123 of particular modes of gameplay. For example, a selection of a 1-v-1 battle mode is a different action than a selection for a battle royal (or battle royale) mode with many opposing combatants. For example, a selection of a survival mode is a different action than a selection for a creative mode, or hardcore mode, or adventure mode. For example, a selection of a racing mini-game is a different action than a selection for a puzzle mini-game.

In some implementations, monitored actions by monitor component 112 may include different types of exchanges. Alternatively, in some implementations, monitored actions by monitor component 112 may exclude some or all types of transactions (such as purchases and/or other exchanges, either by an individual user, or between two users).

In some implementations, monitored actions by monitor component 112 may include starting a particular task and/or mission, entering a particular location, adding a particular virtual item to a user-specific inventory, initiating a particular interaction (e.g., with a particular in-game character, such as knocking down a sentry), using a particular virtual item (e.g., from a user-specific inventory), facing a particular obstacle within a game, experiencing a particular loss within a game (e.g., loss of virtual currency, a virtual item, a virtual life, and/or other in-game items or objects), and/or other (in-game) actions.

In some implementations, monitoring by monitor component 112 may distinguish between different types of actions. For example, the actions may include one or more types of activities that may be performed by individual users 123, e.g., within a game. Alternatively, and/or simultaneously, the actions may include one or more types of accomplishments that may be accomplished by individual users 123, e.g., within a game. For example, the one or more types of activities may be monitored and/or counted by virtue of occurring within gaming platform 105 (e.g., without regard for a particular result and/or outcome). By way of non-limiting example, activities may include chatting, sharing, collaborating, helping, healing, and/or other activities, as well as behaviors. For example, the one or more types of accomplishments may be monitored based on a result or goal being completed, reached, and/or otherwise accomplished. By way of non-limiting example, accomplishments may include reaching a given experience level or XP, beating a given score, winning a race or battle, earning a medal, defeating the final "boss" in a level or mission, reaching a threshold, spending a given amount of time within the game, and/or other accomplishments, as well as results. In some implementations, accomplishments may be discrete and/or otherwise measurable.

In some implementations, monitor component 112 may be configured to monitor user-specific marketplace behavior, including but not limited to purchases made, e.g., external to system 100. In some implementations, monitor component 112 may be configured to monitor user-specific social media behavior, including but not limited to posts and other information shared, viewed, listened to, and/or otherwise used. In some implementations, information regarding user-specific marketplace behavior and/or user-specific social media behavior may be obtained from one or more external resources 128.

Goal component 116 may be configured to obtain and/or determine one or more of objectives, tasks, missions, and/or goals of users. In some implementations, goal component 116 may be configured to obtain and/or determine one or more of objectives, tasks, missions, and/or goals attributed to users. In some implementations, determinations by goal component 116 may be based on monitored actions, such as, e.g., in-game actions monitored by monitor component 112. In some implementations, goal component 116 may be configured to estimate and/or assume a particular user has a particular goal such that the particular goal may be attributed to the user, regardless of whether the particular user actually strives to accomplish the particular goal. For example, goal component 116 may attribute the goal of winning a competitive race within gaming platform 105 to a given user, responsive to the given user participating in the race, even if the given user has not (explicitly and/or otherwise) stated such a goal, and regardless of the given user's intent. In some implementations, goal component 116 may determine and/or estimate a particular objective, task, mission, and/or goal attributed to a given user based on the mode of gameplay selected by the given user. For example, in survival mode, the objective attributed to a given user may be to survive as long as possible. In some implementations, goal component 116 may determine a particular objective, task, mission, and/or goal attributed to a given user based on a particular purchase by the given user. For example, if a given user buys an enchanted sword that is typically used to slay a particular dragon in the game, the objective attributed to the given user may be to slay the dragon.

In some implementations, goal component 116 may determine a particular objective, task, mission, and/or goal attributed to a given user based on a particular location entered by the given user. For example, if a given user enters the evil dragon's lair, the objective attributed to the given user may be to slay the dragon.

In some implementations, goal component 116 may determine a particular objective, task, mission, and/or goal attributed to a given user based on a particular virtual item added to the inventory of the given user. For example, if a given user adds a dragon's egg to his/her inventory, the objective attributed to the given user may be to raise and train a dragon.

In some implementations, goal component 116 may determine a particular objective, task, mission, and/or goal attributed to a given user based on a particular interaction. For example, if a given user knocks down a sentry, the objective attributed to the given user may be to break in or out of the structure guarded by the sentry.

In some implementations, goal component 116 may determine a particular objective, task, mission, and/or goal attributed to a given user based on a particular obstacle faced by the given user within gaming platform 105. For example, if a given user faces a particular boss and/or other challenge, the objective attributed to the given user may be to beat the particular boss and/or challenge.

In some implementations, goal component 116 may determine a particular objective, task, mission, and/or goal attributed to a given user based on a particular loss experienced by the given user within gaming platform 105. For example, if a given user dies in a game, the objective attributed to the given user may be to progress past the point where the given user died.

In some implementations, goal component 116 may determine a particular objective, task, mission, and/or goal attributed to a given user based on a particular activity performed by the given user within gaming platform 105. For example, if a given user performs a particular (type of) activity such as helping another user, the objective attributed to the given user may be to increase social interaction and/or collaboration within gaming platform 105 with other users.

In some implementations, goal component 116 may determine a particular objective, task, mission, and/or goal attributed to a given user based on a particular accomplishment achieved by the given user within gaming platform 105. For example, if a given user achieves a particular (type of) accomplishment such as beating a particular level, the objective attributed to the given user may be to advance to and/or beat the next level within gaming platform 105.

In some implementations, one or more in-game objectives may be based on a current in-game task or in-game mission attributed to a given user. For example, if a mission is to capture a flag, in-game objectives may include overcoming obstacles to capturing the flag. In some implementations, one or more in-game objectives may be based on particular in-game characters opposite to a given user (such as, e.g., a hard-to-beat boss, or a character attacking the given user within the game). For example, if a given user faces the hard-to-beat boss, in-game objectives may include defeating the hard-to-beat boss, reducing the capacity of the hard-to-beat boss to mount a defense during battle, increasing the hardship experienced by the hard-to-beat boss or his henchmen during battle, etc. In some implementations, one or more in-game objectives may be based on in-game virtual items a given user is building and/or collecting. For example, if a given user starts building a particular type of structure, in-game objectives may include gathering resources needed for building the particular structure. For example, if a given user starts collecting particular virtual items that belong to a set of virtual items, in-game objectives may include completing the set of virtual items.

In some implementations, one or more in-game objectives may be based on one or more obstacles currently preventing progress by a given user within the online gaming platform. In some implementations, one or more in-game objectives may be based on different ways to overcome and/or circumvent obstacles.

In some implementations, goal component 116 may be configured to determine multiple concurrent objectives, tasks, missions, and/or goals of an individual user. For example, a given user may have a first objective to overcome a particular obstacle and a second objective to collect virtual items in a set of virtual items. For example, another user may have a first objective to beat a particular enemy and a second objective to build a particular structure. In some implementations, both users may concurrently have multiple different objectives. In some implementations, more than two users may concurrently have individual sets of objectives, and these sets may be user-specific (e.g., different from each other). In some implementations, a set of in-game objectives may be ranked, such that some objectives are ranked higher (e.g., deemed more important) than other objectives which are ranked lower. For example, in some implementations, one objective may be the primary objective, and other objectives for the same user may be secondary and/or tertiary objectives.

In some implementations, goal component 116 may be configured to determine a particular user-specific objective based on a combination of at least two different types of monitored user-specific behavior. For example, a first type of combination may include monitored user-specific in-game actions combined with monitored user-specific marketplace behavior. For example, a second type of combination may include monitored user-specific in-game actions combined with monitored user-specific social media behavior. For example, a third type of combination may include monitored user-specific in-game actions combined with both monitored user-specific marketplace behavior and monitored user-specific social media behavior.

Figure 3A:
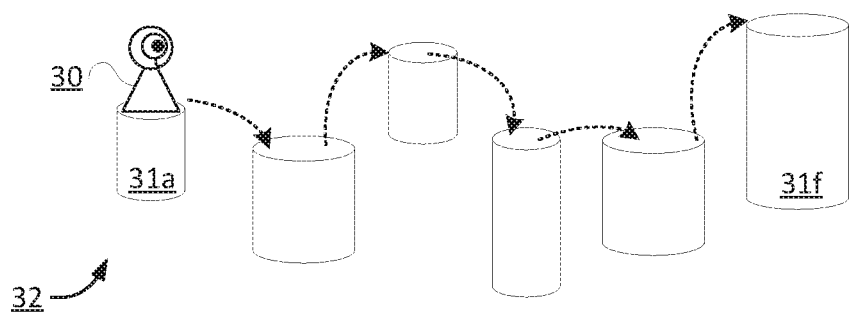
FIGS. 3A-3B illustrate an occurrence of an in-game action that may be monitored in a system as described, in accordance with one or more implementations.
Figure 3B:
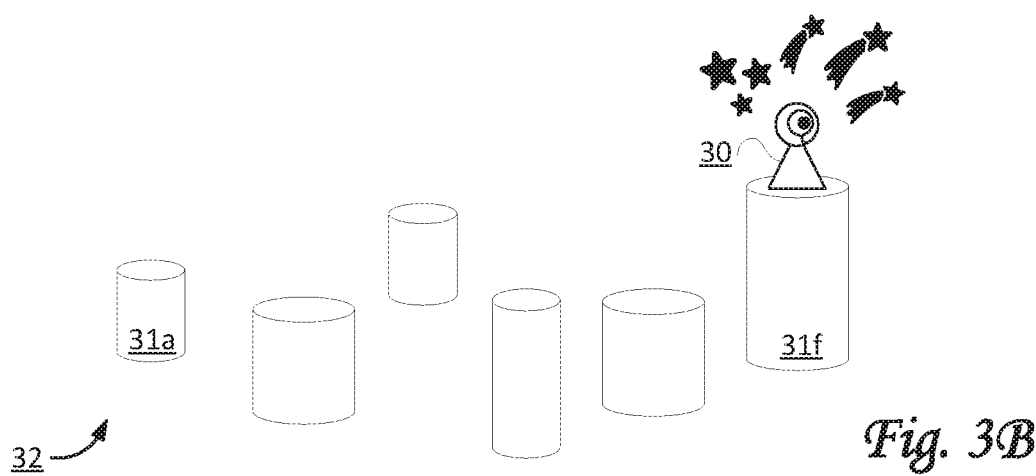

By way of non-limiting example, FIG. 3A and FIG. 3B illustrates an occurrence of an in-game action in a game played by (user-controlled) in-game character 30 in a topography 32. In-game character 30 may be controlled by a particular user. As depicted, the in-game action may include in-game character 30 entering a particular location 31*a* within topography 32. Topography 32 includes a set of objects, including an object 31*f,* which may be reachable through a series of jumps. As depicted in FIG. 3B, if in-game character 30 reaches the top of object 31*f,* a particular award may be awarded to the particular user. As soon as in-game character 30 enters particular location 31*a* in FIG. 3A, goal component 116 may determine a specific goal attributed to the particular user, of reaching the top of object 31*f* (as depicted in FIG. 3B).

Referring to FIG. 1, offer component 110 may be configured to receive information from users 123 that represents virtual items. In some implementations, offer component 110 may be configured to receive information representing sets of virtual items that are available and/or otherwise offered for one or more types of exchange. For example, offer component 110 may receive given information from a given user, the given information representing one or more virtual items that the given user has indicated are available for exchange with other users. In some implementations, a given user may select one or more virtual items (currently owned by the given user) in a particular user interface, and by doing so indicate these virtual items are available for exchange (e.g., offered for auction). Subsequently, offer component 110 may receive a notification and/or other information representing these virtual items. In some implementations, offer component 110 may receive this type of information from multiple different users. For example, the received information may represent that a first user is offering a first virtual item for sale (to other users), a second user is offering a second virtual item for auction (to other users), a third user is offering a third and a fourth item for trade (to other users), and so forth.

Metric component 114 may be configured to determine metric values of metrics of virtual items. For example, a particular metric may represent a marketplace value within gaming platform 105. For instance, a cheap handgun may have a value of 5 golden coins, whereas an advanced semi-automatic gun may have a value of 50 golden coins within gaming platform 105. In some implementations, a given metric may represent effectiveness with regard to a particular in-game objective, task, mission, and/or goal. In some implementations, a given metric may represent helpfulness with regard to a particular in-game objective, task, mission, and/or goal. In some implementations, a given metric may represent usefulness with regard to a particular in-game objective, task, mission, and/or goal. In some implementations, value, effectiveness, helpfulness, and/or usefulness may be represented numerically, for example through one or more absolute values, one or more percentages (assuming, e.g., that a higher percentage represents greater usefulness than a lower percentage), and/or through another numerical representation. For instance, the cheap handgun may be very useful for shooting cans and windows (say, 90% useful), but not useful at all for attacking tanks, or slaying dragons (say, 1% useful). In some implementations, metrics may be specific to an individual in-game objective, task, mission, and/or goal (in particular, as determined by goal component 116). For instance, the advanced semi-automatic gun may be effective in survival mode (say, 90% effective), but not useful in creative mode (say, 5% effective). Alternatively, and/or simultaneously, metrics may be specific to an individual user. For instance, the same gun may be more useful to a first user than a second user, even if they share the same goal.

In some implementations, a given metric may represent, e.g., usefulness with regard to a set of concurrent in-game objectives, tasks, missions, and/or goals of an individual user. For example, for a given user, a given virtual item may have a first usefulness metric value (say, 90%) with regard to the first in-game objective of the given user, and a different second usefulness metric value (say, 50%) with regard to the second in-game objective of the given user. In some implementations, these first and second usefulness metric values may be aggregated in some way (e.g., by averaging, or taking the highest value, or taking the lowest value, and/or otherwise aggregating multiple values). At the same time, for the same user, a different virtual item may have a first usefulness metric value (say, 70%) with regard to the first in-game objective of the given user, and a different second usefulness metric value (say, 60%) with regard to the second in-game objective of the given user. In some implementations, these values may be aggregated (in some implementations, different in-game objectives may be ranked, and the aggregation may be weighted according to ranking, such that usefulness for a primary in-game objective weighs and/or counts more than usefulness for a secondary in-game objective). By way of non-limiting example, these same two virtual items may have different first and second usefulness metric values for another user that has his or her own set of in-game objectives. Individual rational users may be motivated to obtain those available virtual items that are (most) useful in light of the set of current in-game objectives, tasks, missions, and/or goals of the individual rational users.

In some implementations, determinations by metric component 114 may be based, at least in part, on the current inventory of particular users. For example, a particular virtual item may be useful to a given user collecting a set of items that includes the particular virtual item, but not if the given user already has (an instance of) the same item in his or her inventory. Likewise, the first weapon may be more useful than the second same weapon, much less than the third weapon, the fourth weapon, etc. In some implementations, item-specific determinations by metric component 114 (of, e.g., usefulness or effectiveness or desirability) may not rely on the pertinent virtual item being identified, selected, and/or otherwise indicated by a given user. For instance, a given user does not identify, select, and/or otherwise indicate a particular enchanted sword as useful, effective, or desirable. Instead, goal component 116 determines a particular objective (e.g., slaying a magical dragon) that is attributed to the given user, and metric component 114 determines a 90% usefulness for an instance of the particular enchanted sword (that may be currently offered for auction by another user) with regard to accomplishing that particular objective.

Referring to FIG. 3A and FIG. 3B, metric component 114 may determine metric values for different virtual items that are offered for exchange by different users. Based on the objective described for the scenario in FIG. 3A, spring-powered shoe ware may be determined by metric component 114 to have a 90% usefulness, whereas fashionable shoes may only have a 5% usefulness with regard to the objective of reaching the top of object 31f. Likewise, ladders and jumping portion may be very effective, whereas automatic guns are not.

Referring to FIG. 1, presentation component 118 may be configured to present information to users 123. For example, information may be presented through user interfaces 125. The presented information may include information regarding virtual items. For example, the presented information may include information regarding one or more virtual items for which offer component 110 has received information. The presented information may represent metric values and/or (corresponding) metrics. For example, the presented information may represent metric values and/or (corresponding) metrics for one or more virtual items included in and/or selected from one or more sets of virtual items as described in relation to the operation of offer component 110. In some implementations, presentation component 118 may be configured to determine and/or modify the visual prominence for the presentation of information regarding individual virtual items. For example, the determination of individual visual prominence may be based on determinations by metric component 114. For instance, assume a handgun and an automatic gun are available for exchange, having determined effectiveness and/or usefulness to a given user of 5% and 50%, respectively. Presentation component 118 may present information regarding the handgun and the automatic gun (e.g., specifications, price, three-dimensional depiction, etc.). Presentation component 118 may present the automatic gun in a manner that is more visually prominent than the presentation of the handgun. By way of non-limiting example, placing the automatic gun higher in a list of virtual items available for exchange may be more visually prominent than placing the same item lower in the list. Alternatively, and/or simultaneously, increasing the size of the presentation (e.g., using more pixels on a display screen) may be more visually prominent than decreasing the size of the presentation. Alternatively, and/or simultaneously, presentations may be made more visually prominent through the use of one or more of distinctive colors, animations, sound effects, font size, and/or other characteristics of a presentation. In some implementations, visual prominence may be increased by adding indicators, markers, icons, and/or other user interface elements that distinguish a presentation of information regarding a particular virtual item from presentations of information regarding one or more other virtual items. For instance, for virtual items having a determined metric value (say, for usefulness) of 90% or more, presentation component 118 may present the corresponding information by adding a gold start near descriptive information of the particular virtual items.

By way of non-limiting example, FIG. 4A depicts a user interface 40, as may be presented to an individual user by presentation component 118 to facilitate the exchange of virtual items between users. Available virtual items for exchange may be presented as an inventory 41, including a list of virtual items (from 1 to 5), associated item information (from 1 to 5), and graphical user interface elements (here, action buttons) that enable the individual buyer to initiate an exchange, such as, for example an action button 42 that would, upon activation by the individual user, initiate an exchange involving virtual item 1. In some implementations, the associated virtual item information (here, item information 1 to 5) may include item-specific information. For example, store interface 40 may be presented to the individual user subsequent to the events depicted in FIG. 3A.

By way of non-limiting example, FIG. 4B depicts a user interface 45, as may be presented to the individual user by presentation component 118 in such a manner that more useful virtual items have a greater visual prominence in user interface 45. Available virtual items may be presented as an inventory 46, including a list of virtual items (from 1 to 5), associated item information (from 1 to 5), and graphical user interface elements (here, action buttons) that enable the individual user to initiate an exchange, such as, for example an action button 47 that would, upon activation by the individual user, initiate an exchange involving virtual item 2. The presentation of inventory 46 may be dynamically controlled by system 100 as described in this disclosure, such that the presentation is specific for individual users (and, by way of non-limiting example, specific for the objectives attributed to individual users). Store interface 45 may include an indicator 48 that is presented to the individual user. Indicator 48 may represent a particular metric value (for example, for usefulness) exceeding a threshold value (for example, 90%). For example, store interface 45 may be presented to the individual user subsequent to the events depicted in FIG. 3A. Regarding FIG. 4B, in some implementations, the list of virtual items (from 1 to 5) may be ranked, ordered, and/or otherwise organized according to metric values determined by metric component 114. For example, as depicted, the metric values for virtual items 1 to 5 may be ranked from highest to lowest as follows: item 2, item 1, item 3, item 5, item 4, which may correspond with highest to lowest visual prominence. Additionally, virtual item 2 is presented more visually prominent by virtue of its bold font, as well as the font size. Additionally, an indicator 49 (e.g., a graphical user interface element) may be presented to represent a particularly low metric value for a particular virtual item (here, virtual item 4). Perhaps this virtual item is a portion that eliminated a character's ability to jump.

Referring to FIG. 1, transaction component 108 may be configured to facilitate and/or perform exchanges and/or other transactions in system 100, including but not limited to one or more of exchanges of virtual items between users 123 within gaming platform 105, transactions involving items within blockchain 111, transactions involving items within (external) online exchange platforms, and/or other types of exchanges. In some implementations, exchanges may be limited to exchanges involving certain types of virtual items (e.g., virtual items that are usable within gaming platform 105). For example, a sale may involve the given user selling a virtual item to a given buyer (e.g., another user of gaming platform 105).

Blockchain component 122 may be configured to perform actions on blockchain 111, including but not limited to recording transactions/transfers of assets, recording and/or verifying ownership of assets, recording changes in ownership, analyzing ownership of particular assets (e.g., through the history of recorded transactions), and/or other actions. For example, in some implementations, components of system 100 may use one or more functions provided by blockchain component 122 to perform one or more of the actions and/or features attributed to system 100, including but not limited to exchanging virtual items between different users. For example, in some implementations, assets may be implemented as smart contracts on blockchain 111. A verification of asset-ownership may accordingly be implemented as a function on a particular smart contract. Moreover, a transfer of ownership may be implemented by recording and/or storing an address (that identifies the new owner of a particular asset) to blockchain 111 and/or the particular smart contract.

Referring to FIG. 1, store component 124 may be configured to store information on electronic storage 130. In some implementations, stored information may include information obtained and/or determined by system 100 and/or its components. For example, in some implementations, store component 124 may store one or more of information received by offer component 110, objectives determined by goal component 116, metric values determined by metric component 114, and/or other information. In some implementations, stored information may include information regarding which virtual items are useful (and/or effective, etc.) to accomplish which objectives (and/or goals, etc.).

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 128 may include sources of information outside of system 100, external entities participating with system 100, and/or other resources. For example, in some implementations, external resources 128 may include an online exchange platform through which assets may be exchanged between different users. In some implementations, external resources 128 may provide information regarding user-specific marketplace behavior, user-specific social media behavior, and/or other types of user-specific behavior. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
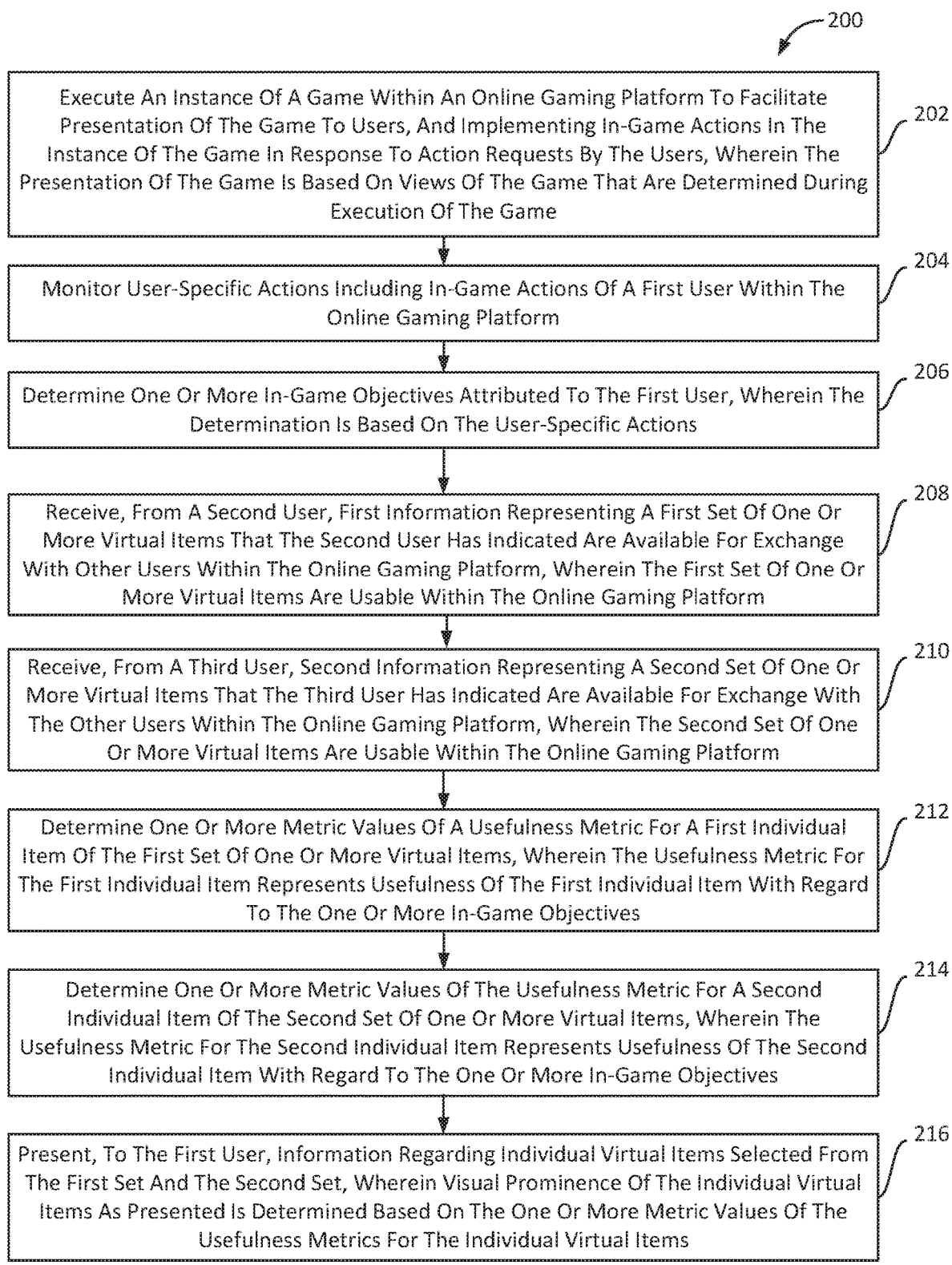
FIG. 2 illustrates a method for dynamic inventory control for player-to-player exchanges between users interacting within an online gaming platform, in accordance with one or more implementations.

FIG. 2 illustrates a method 200 for dynamic inventory control for player-to-player exchanges between users interacting within an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed within the online gaming platform to facilitate presentation of the game to the users, and in-game actions in the instance of the game are implemented in response to action requests for the in-game actions by the users. The presentation of the game is based on views of the game that are determined during execution of the game. In some embodiments, operation 202 is performed by a game component the same as or similar to game component 120 (shown in FIG. 1 and described herein).

At an operation 204, user-specific actions, including in-game actions, of the first user are monitored within the online gaming platform. In some embodiments, operation 204 is performed by a monitor component the same as or similar to monitor component 112 (shown in FIG. 1 and described herein).

At an operation 206, one or more in-game objectives attributed to the first user are determined. The determination is based on the user-specific actions. In some embodiments, operation 206 is performed by a goal component the same as or similar to goal component 116 (shown in FIG. 1 and described herein).

At an operation 208, first information is received from the second user, representing a first set of one or more virtual items that the second user has indicated are available for exchange with other users within the online gaming platform. The first set of one or more virtual items are usable within the online gaming platform. In some embodiments, operation 208 is performed by an offer component the same as or similar to offer component 110 (shown in FIG. 1 and described herein).

At an operation 210, second information is received from the third user, representing a second set of one or more virtual items that the third user has indicated are available for exchange with the other users within the online gaming platform. The second set of one or more virtual items are usable within the online gaming platform. In some embodiments, operation 210 is performed by an offer component the same as or similar to offer component 110 (shown in FIG. 1 and described herein).

At an operation 212, one or more metric values of a usefulness metric are determined for a first individual item of the first set of one or more virtual items. The usefulness metric for the first individual item represents usefulness of the first individual item with regard to the one or more in-game objectives. In some embodiments, operation 212 is performed by a metric component the same as or similar to metric component 114 (shown in FIG. 1 and described herein).

At an operation 214, one or more metric values of the usefulness metric are determined for a second individual item of the second set of one or more virtual items. The usefulness metric for the second individual item represents usefulness of the second individual item with regard to the one or more in-game objectives. In some embodiments, operation 214 is performed by a metric component the same as or similar to metric component 114 (shown in FIG. 1 and described herein).

At an operation 216, information is presented to the first user, the information regarding individual virtual items selected from the first set and the second set. Visual prominence of the individual virtual items as presented is determined based on the one or more metric values of the usefulness metrics for the individual virtual items. In some embodiments, operation 216 is performed by a presentation component the same as or similar to presentation component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for dynamic inventory control for presentations of virtual items that are available for player-to-player exchanges between players of an online gaming platform, wherein the players include a first buyer, a second buyer, a first seller, and a second seller, the method comprising:

executing an instance of a game within the online gaming platform to facilitate presentation of the game to the players through client computing platforms associated with the players, wherein the presentation of the game is based on views of the game that are determined during execution of the instance of the game, wherein the client computing platforms include a first client computing platform that is associated with the first buyer and a second client computing platform that is associated with the second buyer;

determining a first in-game objective attributed to the first buyer, based on a current in-game task or in-game mission of the first buyer;

determining a second in-game objective attributed to the second buyer, based on a second current in-game task or in-game mission of the second buyer;

receiving, from the first seller, first information representing a first virtual item that the first seller has indicated is available for exchange with other players within the online gaming platform, wherein the first virtual item is usable within the online gaming platform;

receiving, from the second seller, second information representing a second virtual item that the second seller has indicated is available for exchange with the other players within the online gaming platform, wherein the second virtual item is usable within the online gaming platform;

automatically determining a first buyer-specific and item-specific metric value of a usefulness metric for the first virtual item, wherein the usefulness metric for the first virtual item represents usefulness with regard to the first in-game objective;

automatically determining a second buyer-specific and item-specific metric value of the usefulness metric for the second virtual item, wherein the usefulness metric for the second virtual item represents usefulness with regard to the first in-game objective;

automatically determining a third buyer-specific and item-specific metric value of a second usefulness metric for the first virtual item, wherein the second usefulness metric for the first virtual item represents usefulness with regard to the second in-game objective;

automatically determining a fourth buyer-specific and item-specific metric value of the second usefulness metric for the second virtual item, wherein the second usefulness metric for the second virtual item represents usefulness with regard to the second in-game objective;

presenting, on the first client computing platform of the first buyer, a player interface, wherein the player interface displays information regarding the first and second virtual items that are offered to the first buyer for exchange, wherein a first visual prominence of the displayed information regarding the first item as presented in the player interface is based on the first buyer-specific and item-specific metric value of the usefulness metric for the first virtual item, and wherein a second visual prominence of the displayed information regarding the second virtual item as presented in the player interface is based on the second buyer-specific and item-specific metric value of the usefulness metric for the second virtual item; and presenting, on the second client computing platform of the second buyer, a second player interface, wherein the second player interface displays information regarding the first and second virtual items that are offered to the second buyer for exchange, wherein a third visual prominence of the displayed information regarding the first virtual item as presented in the second player interface is based on the third buyer-specific and item-specific metric value of second usefulness metric for the first virtual item, and wherein a fourth visual prominence of the displayed information regarding the second virtual item as presented in the second player interface is based on the fourth buyer-specific and item-specific metric value of the second usefulness metric for the second virtual item.

2. The method of claim 1, wherein determining the first buyer-specific and item-specific value of the usefulness metric for the first virtual item is based on a first inventory of virtual items that are available to the first buyer.

3. The method of claim 1, wherein the first buyer, the second buyer, the first seller, and the second seller are different players.

4. The method of claim 1, wherein the first in-game objective is further based on one or more of:
(i) in-game characters opposite to the first buyer, and
(ii) in-game virtual items the first buyer is building and/or collecting.

5. The method of claim 1, wherein the first in-game objective is further based on one or more obstacles currently preventing progress by the first buyer within the online gaming platform.

6. The method of claim 1, wherein the first and second visual prominence of the first and second virtual items as presented in the player interface includes individual rankings in a ranked list including the first and second virtual items.

7. The method of claim 1, wherein the first and second visual prominence of the first and second virtual items as presented in the player interface corresponds to sizes of individual on-screen areas used to present the first and second virtual items.

8. A system configured to provide dynamic inventory control for presentations of virtual items that are available for player-to-player exchanges between players interacting within an online gaming platform, wherein the players include a first buyer, a second buyer, a first seller, and a second seller, the system comprising:
one or more hardware processors configured by machine-readable instructions to:
execute an instance of a game within the online gaming platform to facilitate presentation of the game to the players through client computing platforms associated with the players, wherein the presentation of the game is based on views of the game that are determined during execution of the instance of the game, wherein the client computing platforms include a first client computing platform that is associated with the first buyer and a second client computing platform that is associated with the second buyer;
determine a first in-game objective attributed to the first buyer, based on a current in-game task or in-game mission of the first buyer;
determine a second in-game objective attributed to the second buyer, based on a second current in-game task or in-game mission of the second buyer;
receive, from the first seller, first information representing a first virtual item that the first seller has indicated is available for exchange with other players within the online gaming platform, wherein the first virtual item is usable within the online gaming platform;
receive, from the second seller, second information representing a second virtual item that the second seller has indicated is available for exchange with the other players within the online gaming platform, wherein the second virtual item is usable within the online gaming platform;
automatically determine a first buyer-specific and item-specific metric value of a usefulness metric for the first virtual item, wherein the usefulness metric for the first virtual item represents usefulness with regard to the first in-game objective;
automatically determine a second buyer-specific and item-specific metric value of the usefulness metric for the second virtual item, wherein the usefulness metric for the second virtual item represents usefulness with regard to the first in-game objective;
automatically determine a third buyer-specific and item-specific metric value of a second usefulness metric for the first virtual item, wherein the second usefulness metric for the first virtual item represents usefulness with regard to the second in-game objective;
automatically determine a fourth buyer-specific and item-specific metric value of the second usefulness metric for the second virtual item, wherein the second usefulness metric for the second virtual item represents usefulness with regard to the second in-game objective;
present, on the first client computing platform of the first buyer, a player interface, wherein the player interface displays information regarding the first and second virtual items that are offered to the first buyer for exchange, wherein a first visual prominence of the displayed information regarding the first virtual item as presented in the player interface is based on the first buyer-specific and item-specific metric value of the usefulness metric for the first virtual item, and wherein a second visual prominence of the displayed information regarding the second virtual item as presented in the player interface is based on the second buyer-specific and item-specific metric value of the usefulness metric for the second virtual item; and
present, on the second client computing platform of the second buyer, a second player interface, wherein the second player interface displays information regarding the first and second virtual items that are offered to the second buyer for exchange, wherein a third visual prominence of the displayed information regarding the first virtual item as presented in the second player interface is based on the third buyer-specific and item-specific metric value of second usefulness metric for the first virtual item, and wherein a fourth visual prominence of the displayed information regarding the second virtual item as presented in the second player interface is based on the fourth buyer-specific and item-specific metric value of the second usefulness metric for the second virtual item.

9. The system of claim 8, wherein determining the first buyer-specific and item-specific value of the usefulness metric for the first virtual item is based on a first inventory of virtual items that are available to the first buyer.

10. The system of claim 8, wherein the first buyer, the second buyer, the first seller, and the second seller are different players.

11. The system of claim 8, wherein the first in-game objective is further based on one or more of:
   (i) in-game characters opposite to the first buyer, and
   (ii) in-game virtual items the first buyer is building and/or collecting.

12. The system of claim 8, wherein the first in-game objective is further based on one or more obstacles currently preventing progress by the first buyer within the online gaming platform.

13. The system of claim 8, wherein the first and second visual prominence of the first and second virtual items as presented in the player interface includes individual rankings in a ranked list including the first and second virtual items.

14. The system of claim 8, wherein the first and second visual prominence of the first and second virtual items as presented in the player interface corresponds to sizes of individual on-screen areas used to present the first and second virtual items.

\* \* \* \* \*